C. A. HENRY.
COUNTERPOISING MECHANISM.
APPLICATION FILED JULY 15, 1918.

1,309,198.

Patented July 8, 1919.
2 SHEETS—SHEET 1.

INVENTOR.
Charles A. Henry.
BY
ATTORNEY.

WITNESS.

THE COLUMBIA PLANOGRAPH CO., WASHINGTON, D. C.

C. A. HENRY.
COUNTERPOISING MECHANISM.
APPLICATION FILED JULY 15, 1918.
1,309,198.
Patented July 8, 1919.
2 SHEETS—SHEET 2.
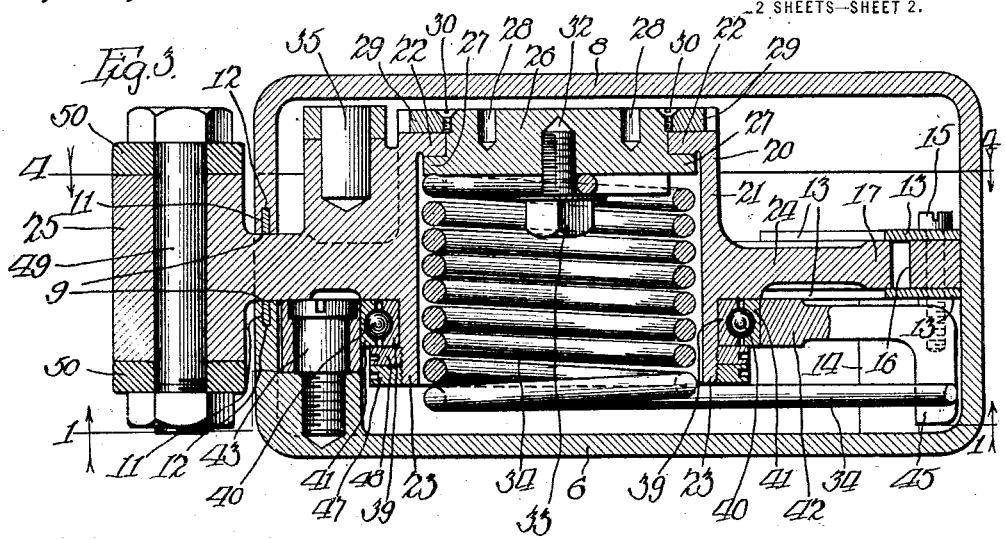
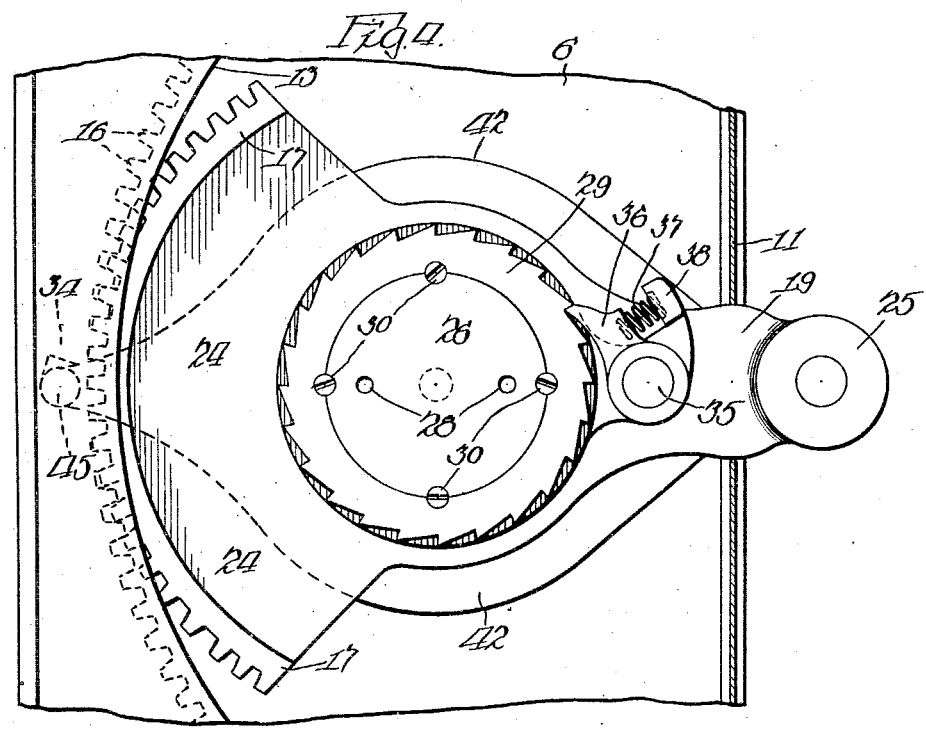
INVENTOR.
Charles A. Henry.
BY
ATTORNEY.

UNITED STATES PATENT OFFICE.

CHARLES A. HENRY, OF CHICAGO, ILLINOIS.

COUNTERPOISING MECHANISM.

1,309,198.      Specification of Letters Patent.      Patented July 8, 1919.

Application filed July 15, 1918. Serial No. 244,831.

*To all whom it may concern:*

Be it known that I, CHARLES A. HENRY, a citizen of the United States, residing at Chicago, in the county of Cook and State of Illinois, have invented certain new and useful Improvements in Counterpoising Mechanism, of which the following is a specification.

This invention relates to improvements in means to be used on vehicles, particularly automobiles and ambulances, for reducing to a minimum, or practically eliminating, jolts, shocks or abrupt vibrations incident to the travel or movement of the wheels of such vehicles over uneven surfaces of roads or over protruding obstacles thereon or depressions therein, and it consists in certain peculiarities of the construction, novel arrangement and operation of the various parts thereof as will be hereinafter more fully set forth and specifically claimed.

One of the objects of the invention is to provide mechanism of the above mentioned general character, which shall be simple and inexpensive in construction, strong, durable and efficient in operation, and so made that it can be readily attached to the frame and axles of the vehicle without detracting from the appearance of the latter. Another and important object is to provide means whereby the ordinary or commonly used springs or so called shock absorbers may be dispensed with, and the thrusts or movements of the body of the vehicle imparted thereto by the wheels passing over rough or uneven roads or surfaces thereof will be brought to a poise by substantially counter-balancing or opposing them with substantially equal power or effect, thereby producing almost perfect equilibrium in the body of the vehicle, and so that it will have very slight undulating movements only in the travel of the vehicle.

Various other objects and advantages of the invention will be disclosed in the subjoined description and explanation.

In the accompanying drawings, which serve to illustrate an embodiment of the invention, Figure 1 is a view in side elevation partly in section taken on line 1—1 of Fig. 3 looking in the direction indicated by the arrows and illustrating the parts of the mechanism in their neutral or normal positions.

Fig. 3 is a plan sectional view through one of the casings of the mechanism taken on line 3—3 of Fig. 1, and Fig. 4 is a view in side elevation showing a fragment of the casing of the device and illustrating the means for regulating the tension of the counterpoising spring carried thereby.

Like numerals of reference refer to corresponding parts throughout the different views of the drawings.

Figure 2:
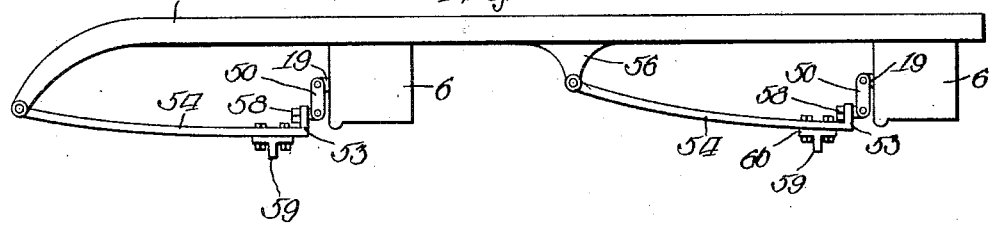
Fig. 2 is a diagrammatic view of a portion of the frame of an automobile or vehicle showing it equipped with my improved mechanism.

In practice four of the mechanisms or devices are employed on the automobile or vehicle, two of which are mounted on each side of the frame thereof near the axles, as is clearly shown in Fig. 2 of the drawings. As the devices or mechanisms are all of the same construction, it is obvious that it is only necessary to show and describe one of them.

Figure 1:
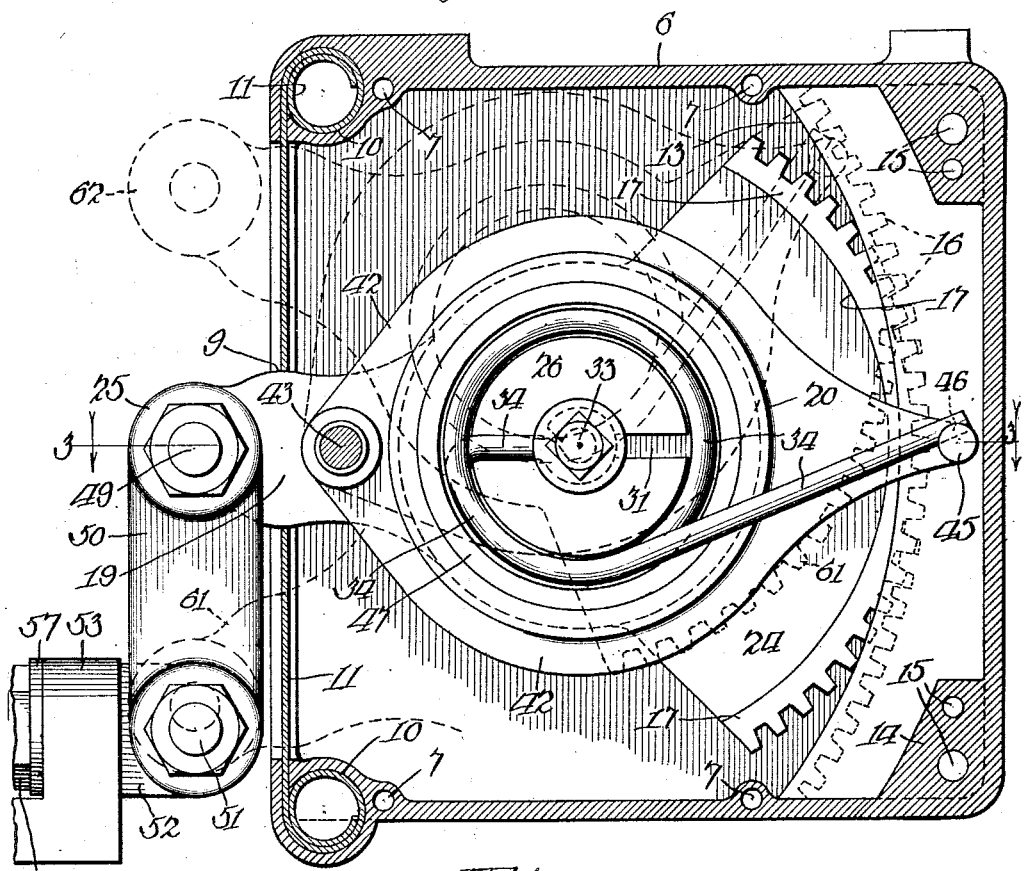

Referring now to the drawings, the reference numeral 6 designates the body portion of the casing, which casing may be made of any suitable size, form and material, but preferably of metal and substantially rectangular in shape as shown. The portion 6 of the casing is provided at suitable points therein with a number of openings 7 for the reception of bolts or tie rods used to fasten the cap or cover 8 of the casing in position on the body portion 6 so as to tightly close the same for the purpose of excluding dust and other extraneous matter, as well as, for the purpose of providing a container for the mechanism and for a suitable lubricant therefor. The body portion 6 of the casing has in one of its end walls a vertical slot 9 which extends from near the top of the casing to near its bottom and is for the reception and operation of a certain part of the mechanism as will be presently explained. At each end of the slot 9 the body 6 of the casing is provided with a transversely disposed circular opening 10 for the reception and operation of portions of a very thin steel or metal ribbon 11 which is extended the entire length of the slot 9 and is movably held at its edges in rabbets 12 formed in the faces of said slot. As is clearly shown in Fig. 1 of the drawings, the ends of the spring ribbon or member 11 are coiled in the openings 10 of the casing body so that when said spring ribbon is moved in either direction it will coil upon itself at one of its ends and uncoil at its other end. At its end opposite that end having a slot 9 therein, the casing is provided on its inner surface with a pair of spaced apart guide plates 13 which extend from the top to the bottom of the casing and are secured to blocks 14 or bosses by means of bolts 15, one of which blocks or bosses is located in the upper and lower corners of the casing opposite the slot therein. Located between the guide plates 13 is a segmental rack 16 which is firmly held in place by means of the bolts 15 which secure the guide plates 13 to their supports. By reference to the drawings it will be observed that the arc described by the teeth of the segmental rack 16, is curved outwardly from the slotted portion of the casing and that the guide plates 13 overlap the teeth of said rack thus forming a vertical guideway or channel for the reception and operation of the segmental gear 17 which meshes with the said rack.

The spring ribbon 11 has about midway between its ends an opening through which the arm 19 of the master or controlling member which is designated as a whole by the reference numeral 20 extends. The master or controlling member 20 comprises a hollow casing 21, which is preferably cylindrical in shape and has at one of its ends an internal annular flange 22 and its other end externally screw threaded as at 23, an extension 24 on which the segmental gear 17 is mounted and the arm 19 which has on its outer end an apertured hub 25. As shown this member is located within the casing 6 so that the middle portion of the gear 17 will mesh with the middle portion of the rack 16, and in such a manner that the arm 19 will extend through the slot 9 in the casing of the device. Located in the casing 21 of the master member is a disk 26 which has on its inner portion an annular flange 27 which rests against the inner surface of the flange 22 of said casing. This disk or block 26 is provided on its outer surface with openings 28 for the members of a spanner wrench by means of which said disk or block as well as the ratchet toothed ring 29 which is fitted around said disk and secured in place thereon by means of screws 30 seated so as to engage both the disk and said ring and in such a way as to hold the latter against the end of the casing 21 of the master or controlling member, can be turned. On its inner surface the block or disk 26 is provided with a diametrically extended slot 31 and centrally with a screw threaded opening 32 to receive a screw bolt 33 to the inner portion of which is secured one end of a coiled spring 34 which is nested in the casing 21 and has its other end extended tangentially to a point near the middle portions of the rack 16 and segmental gear.

Pivotally mounted on a post 35 carried by the member 20 and located on the arm 19 of said member near the ratchet toothed ring 29 is a pawl 36 which is normally held in engagement with the teeth of said ring by means of a spring 37 interposed between the pawl and a lug or projection 38 on the arm of the master member. That portion of the casing 21 of said member on the opposite sides of the arm 19 and extension 24 thereof is annularly reduced and has fitted therearound a race 39 for anti-friction balls 40 which are interposed between said race and another race or ring 41 caried by an apertured lever 42 which lever surrounds the races 39 and 41 and is fulcrumed at one of its ends on a pivot 43 screwed into a boss or block 44 located within the casing 6 near the slot 9 thereof and at about the middle of the same. The other end of the lever 42 is extended to a point near the wall of the casing against which the guide plates 13 rest and has at said end a laterally extended arm 45 formed with a recess 46 in which the outer end of the spring 34 rests. The races or rings 39 and 41 are held in position by means of ring nuts 47 and 48 which engage the reduced portion of the casing 21 of the master member. Pivotally connected at their upper ends to a bolt 49 located in the opening of the hub 25 on the arm 19 of the master member are a pair of links 50 which are pivotally connected at their lower ends to a bolt 51 extended through an opening in a connecting member or rod 52 which is rotatably mounted in an upturned portion 53 on a bar 54 which is pivotally connected at its opposite end to the frame 55 or a bracket 56 thereon, see Fig. 2 of the drawings. The member or rod 52 is held in place on the extension 53 by means of a washer 57 and a nut 58 engaging said member or rod. As shown in Fig. 2 the casing 6 of each of the devices is mounted on the side of the frame 55 and may be secured thereto in any suitable manner. The bars 54, which extend longitudinally with the sides of the frame 55 are mounted on the axles 59 of the vehicle near the ends of said axles and are held in place by means of clips 60 bolted thereon. From the foregoing and by reference to the drawings, it will be readily understood and clearly seen, that when the frame of the vehicle is equipped with four of the devices, located as above stated, two on each side of the frame and near the ends of the axles, the cover 8 of each casing can be removed so as to permit of access to the tension regulating disk or block 26 carried by the master member. By inserting a spanner wrench into the openings 28 in said disk and turning the same in the proper direction, it is apparent that the tension of the counterpoising spring 34 can be regulated to suit the weight of the vehicle body, in which case the parts will assume or occupy their neutral or normal positions as shown by continuous lines in Fig. 1 of the drawings. After replacing the cover 8 of each of the casings and securing it in place, the mechanism is ready for use and the operation thereof will be as follows: Should the wheels of the vehicle pass into a depression, the master member 20 and its parts will assume about the position shown by dotted lines at 61 in Fig. 1 of the drawings provided the depression into which the wheel or wheels of the vehicle has passed is deep enough to cause such movement of the said parts, but if not deep enough it will be understood that the movements of the parts will be correspondingly less or shorter. In the event of the wheels of the vehicle striking a protruding obstacle on the surface of the road the movement of the parts will be to about the positions shown by dotted lines at 62 in Fig. 1 of the drawings, in either of which cases it will be understood that the counterpoising spring 34 acting on the master member 20 and lever 42 will oppose the downward or upward movement of the body of the vehicle with substantially equal power or effect thus producing almost perfect equilibrium in the body of the vehicle and rendering its movements of a slight undulating character.

While I have illustrated and described an embodiment of the invention in a form of construction for carrying it into effect when employed in connection with a vehicle, yet this is capable of variation and modification without departing from the spirit of the invention. I, therefore, do not wish to be limited to the precise details of construction as set forth and disclosed, but desire to avail myself of such variations, modifications and modes of its use as come within the scope of the appended claims.

Having thus fully described my invention what I claim as new and desire to secure by Letters Patent, is—

1. A device of the character described, consisting of a rack mounted on and in fixed relation to a movable body, a member having a gear in mesh with said rack and also having its portion opposed to said rack loosely connected to said body, a coiled spring carried by said member and fixed at one of its ends thereto and having its other end extended therefrom in the direction of said rack, and a lever engaging said member and fulcrumed near said loosely connected portion thereof and engaging the extended portion of said spring.

2. A device of the character described, consisting of a segmental rack vertically mounted on and in fixed relation to a movable body, a member having a vertically disposed segmental gear in mesh with said rack and also having its portion opposite said rack loosely connected to said body, a coiled spring carried by said member and fixed at one of its ends thereto and having its other end extended therefrom in the direction of said rack, and a lever engaging said member and fulcrumed near said loosely connected portion thereof and engaging the extended portion of said spring.

3. A device of the character described, consisting of a rack mounted on and in fixed relation to a movable body, a member having a gear in mesh with said rack and also having its portion opposed to said rack loosely connected to said body, a coiled spring carried by said member and fixed at one of its ends thereto and having its other end extended therefrom in the direction of said rack, a lever engaging said member and fulcrumed near said loosely connected portion thereof and engaging the extended portion of said spring, and means carried by said member to regulate the tension of the spring.

4. A device of the character described, consisting of a segmental rack vertically mounted on and in fixed relation to a movable body, a member having a vertically disposed segmental gear in mesh with said rack and also having its portion opposite said rack loosely connected to said body, a coiled spring carried by said member and fixed at one of its ends thereto and having its other end extended therefrom in the direction of said rack, a lever engaging said member and fulcrumed near said loosely connected portion thereof and engaging the extended portion of said spring, and means carried by said member to regulate the tension of the spring.

5. A device of the character described, consisting of a casing having a slot in one of its walls, a segmental rack mounted in the casing at the wall thereof opposite said slotted wall and located in register with said slot, a master member having a segmental gear in mesh with said rack and provided with an arm opposite said rack, said arm extended through said slot, a coiled spring carried by said member and fixed at one of its ends thereto and having its other end extended therefrom in the direction of said rack, and a lever surrounding a portion of said member and fulcrumed near the arm thereof and engaging the extended portion of said spring.

6. A device of the character described, consisting of a casing having a slot in one of its walls, a segmental rack mounted in the casing at the portion thereof opposite the slotted wall and located in register with said slot, a master member having a segmental gear in mesh with said rack and provided with an arm opposite said rack, said arm extended through said slot, means actuated by said arm in its movements to close said slot, a coiled spring carried by said member and fixed at one of its ends thereto and having its other end extended therefrom in the direction of said rack, and a lever surrounding a portion of said member and fulcrumed near the arm thereof and engaging the extended portion of said spring.

7. A device of the character described, consisting of a casing having a slot in one of its walls, a segmental rack mounted in that portion of the casing opposite said slotted wall and located in register with said slot, a master member having a casing provided with a gear in mesh with said rack, said casing also having an arm opposite said rack extended through said slot, a disk rotatably mounted in one end of the casing of said member, rachet teeth carried by said disk, a spring actuated pawl adapted to engage said teeth, a coiled spring located in the casing of said member and fixed at one of its ends to said disk and having its other end extended from said member in the direction of said rack, and a lever surrounding a portion of said member and fulcrumed near the arm thereof and engaging the extended portion of said spring.

8. In a device of the character described, the combination with a vehicle frame, of a casing vertically mounted thereon in fixed relation thereto, said casing having in one of its walls a slot provided in each face thereof with a longitudinal groove, said casing having near each end of said slot a circular opening in communication with said grooves, a flexible ribbon located in said grooves and having its ends coiled in said openings, a segmental rack mounted in the casing near the wall opposite the slotted wall thereof, a master member having a segmental gear in mesh with said rack and provided with an arm opposite said rack, said arm extended through an opening in said ribbon and through said slot, a coiled spring carried by said member and fixed at one of its ends thereto and having its other end extended therefrom in the direction of said rack, means loosely connecting said arm to the frame of a vehicle and mounted on the axle thereof, a lever engaging the master member and fulcrumed near the arm thereof and engaging the extended portion of said spring, and means carried by said member to regulate the tension of the spring.

CHARLES A. HENRY.

Witnesses:
C. CASEY,
CHAS. C. TILLMAN.

Copies of this patent may be obtained for five cents each, by addressing the "Commissioner of Patents, Washington, D. C."